United States Patent
Kerlin

(10) Patent No.: US 7,034,498 B2
(45) Date of Patent: Apr. 25, 2006

(54) RESONANT MOTOR SYSTEM

(75) Inventor: Jack H. Kerlin, Provo, UT (US)

(73) Assignee: RT Patent Company, Inc., Wilmington, DE (US)

( * ) Notice: Subject to any disclaimer, the term of this patent is extended or adjusted under 35 U.S.C. 154(b) by 0 days.

(21) Appl. No.: 10/821,797

(22) Filed: Apr. 8, 2004

(65) Prior Publication Data

US 2004/0227486 A1 Nov. 18, 2004

Related U.S. Application Data

(63) Continuation of application No. 10/274,420, filed on Oct. 18, 2002.

(60) Provisional application No. 60/508,438, filed on Oct. 3, 2003.

(51) Int. Cl.
*H02P 1/40* (2006.01)

(52) U.S. Cl. ............... 318/747; 318/751; 318/752; 318/254

(58) Field of Classification Search ............... 318/747, 318/751, 752, 794, 795, 701, 254

See application file for complete search history.

(56) References Cited

U.S. PATENT DOCUMENTS

| | | | |
|---|---|---|---|
| 3,120,633 A | 2/1964 | Genuit | |
| 3,638,098 A | 1/1972 | Walter | |
| 4,064,442 A | 12/1977 | Garron | |
| 4,599,687 A | 7/1986 | Smith | |
| 4,622,510 A * | 11/1986 | Cap | ............... 322/2 A |
| 4,772,814 A | 9/1988 | Lewus | |
| 5,243,268 A | 9/1993 | Klatt | |
| 5,450,305 A * | 9/1995 | Boys et al. | ............... 363/24 |
| 5,506,492 A | 4/1996 | Harris | |
| 5,689,164 A | 11/1997 | Hoft et al. | |
| 5,902,506 A * | 5/1999 | Scott et al. | ............... 219/608 |
| 6,093,987 A | 7/2000 | Bukoschek et al. | |
| 6,307,345 B1 | 10/2001 | Lewis | |
| 6,343,021 B1 * | 1/2002 | Williamson | ............... 363/8 |
| 6,384,564 B1 | 5/2002 | Pollock | |
| 6,417,598 B1 | 7/2002 | Grehant | |

* cited by examiner

*Primary Examiner*—Rina Duda
(74) *Attorney, Agent, or Firm*—Jones Day

(57) ABSTRACT

In a resonant motor system, an electrical motor having a stator with one or more windings, a rotor which may or may not be wound, and an air gap between the stator and the rotor for storing magnetic energy such that the motor exhibits a definite electrical inductance deployed with a drive combination including a capacitance connected in series with the inductance of the motor to form an LCR circuit therewith. Phased provision of DC power to the LCR circuit causes the circuit to oscillate, which excites the motor. The DC power is provided in synchronism with the rotation of the rotor in order to maximize torque produced by the motor.

13 Claims, 13 Drawing Sheets

Positive Half-Cycle

Positive Half-Cycle

Negative Half-Cycle

Negative Half-Cycle

DISCHARGE PULSE

DUTY-CYCLE = t/T

DUTY-CYCLE SHOWN AT 50% = HALF FULL-LOAD TORQUE

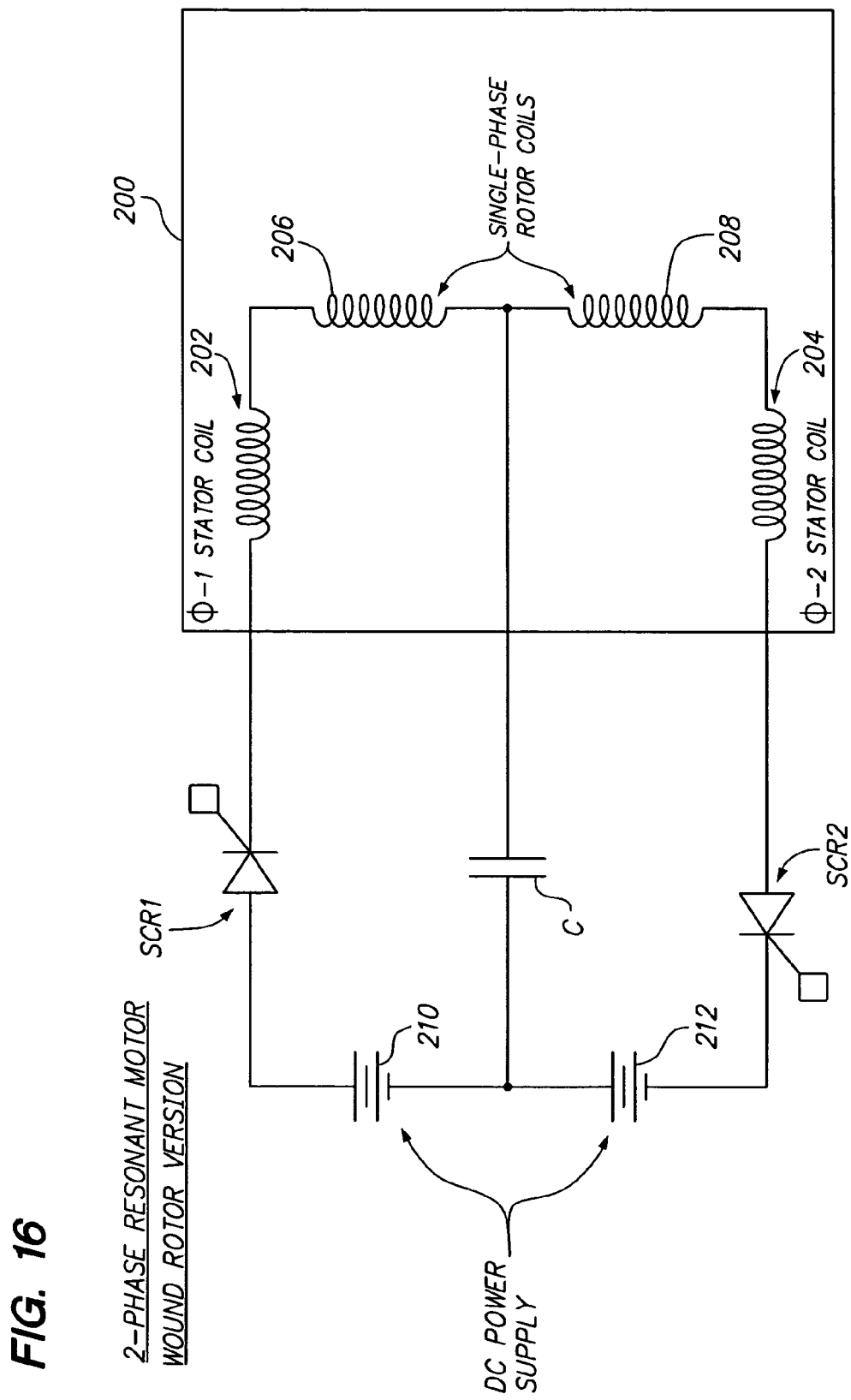

RESONANT MOTOR SYSTEM

This application is a continuation of application Ser. No. 10/274,420 filed on Oct. 18, 2002, the contents of which are incorporated herein by reference. This application claims the benefit of Provisional Application No. 60/508,438, filed on Oct. 3, 2003, the contents of which are incorporated herein by reference.

FIELD OF THE INVENTION

The invention is generally in the field of electrical motors. More particularly, the invention concerns an electrical motor caused to operate in response to one or more alternating electrical signals. The invention also relates to an electrical motor system in which an electrical motor is connected to form a resonant circuit with a drive capacitance through which is provided the excitation which causes the motor to operate.

BACKGROUND OF THE INVENTION

Electrical motors are well known. Although there is a host of electrical motor designs, the standard 3-phase AC induction motor is the established workhorse of industry. In its essential aspects this electrical motor is a direct electromechanical analogue of the 3-phase generators utilized in power plants. In this regard, the 3-phase induction motor is a natural fit for the type of AC power available for its operation. When running directly from 3-phase AC grid power, no conceivable motor scheme is more adaptable or efficient than the 3-phase AC induction motor.

A "drive" (sometimes called a "controller") provides the excitation that causes an electrical motor to operate. Conventional variable frequency AC drives attempt to duplicate the voltage/current characteristics of 3-phase power to obtain the most efficient performance from an AC induction motor. In so doing the drive must create three sinusoidal waveforms, each mutually displaced from the other two by 120 degrees, from a DC power source located either external to the drive or internally as the "DC link". Viewed overall, an AC motor is made to run from a DC source where the drive mediates the interface between two different formats of electrical energy.

The so-called "brushless DC motor" is basically the same machine as the AC induction motor except that the squirrel-cage rotor of the latter is replaced with a permanent magnet rotor. Each type uses an identical 3-phase stator and each requires the same 3-phase AC drive power to the stator. In some respects the brushless DC motor is more suitable to the electronic drive because large reactive currents inherent in the AC induction motor are largely non-existent in the brushless DC version, which simplifies drive design and reduces some losses. However, because of the cost and difficulty involved in managing large quantities of permanent magnet material, the brushless DC motor has not proven commercially viable in higher horsepower ranges.

A present problem with electrical motor systems is the difficulty of merging motor and drive in a simple, easily assembled, efficient, and economical combination. Typically, a drive, in synthesizing an AC waveform to excite an electrical motor from a DC power source employs expensive, high capacity switching devices such as IGBTs (Insulated Gate Bipolar Transistors) to generate a high frequency PWM (Pulse Width Modulation) waveform. Such drives are characterized by complexity in a customized design that generates and accommodates a PWM waveform, cost in circuit implementation, and inefficiency resulting from switching losses associated with PWM. Current drive design and construction result in a sizable piece of equipment that consumes resources for storage, shipment, and installation.

In contrast, in this invention, electrical motor and drive are merged into a single, inexpensive, highly effective, integrated design. Rather than accommodate the standard AC induction motor to a large, expensive DC power source, the motor itself is modified to make it compatible to a DC power input, whether directly from a battery pack or fuel cell, or from rectified AC power. In this regard, the motor is provided with a sizable air gap between the stator and the rotor in order to impart a pronounced magnetic inductance to the motor itself. This inductance is placed in series with capacitance to constitute a resonant circuit which is caused to oscillate when DC power is switched to it. The waveform or waveforms produced by the oscillation of the resonant circuit excite the motor.

BRIEF DESCRIPTION OF THE DRAWINGS

Reference to the Figures will provide a more complete understanding of the principles, innovations, and examples set forth in the detailed description and claims. In these figures:

FIG. 16 is a schematic diagram of a two-phase resonant motor system.

DETAILED DESCRIPTION

Figure 1:
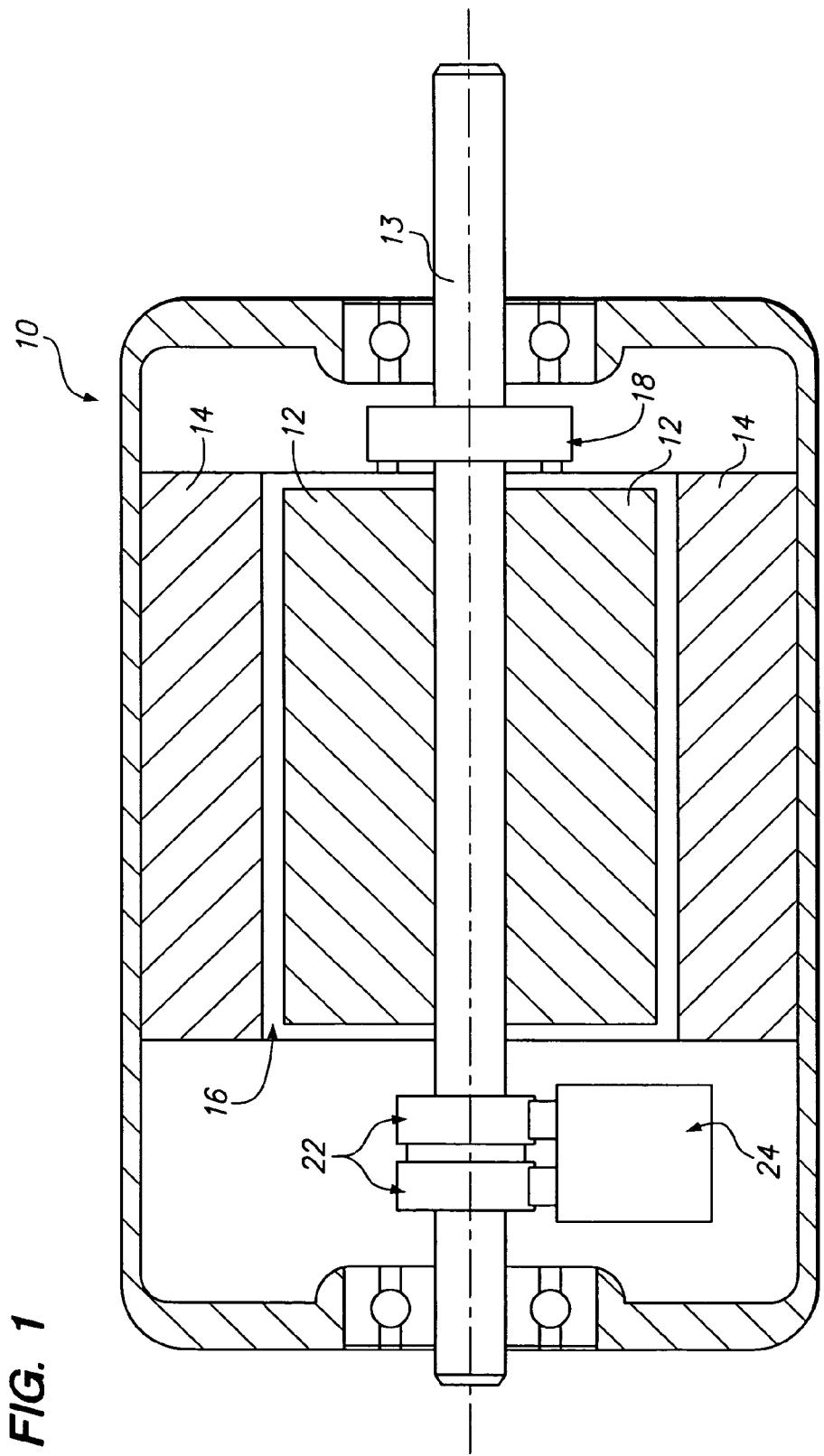
FIG. 1 is a side sectional view of an electrical motor showing its principal parts, including a pronounced gap between a rotor and a stator for storing energy.

In this description, the term "resonant motor system" is used. In such a system, an electrical motor has a physical air gap between the stator and rotor of a size sufficient to store magnetic energy so that the motor's coils (also "windings") in combination with the elements on which they are disposed and the air gap exhibit the electrical properties of an inductor, instead of the electrical properties of a transformer. When the inductance of the motor is connected in series with a capacitor, a resonant circuit results of which the motor itself constitutes the inductive element. The critical insight is that such a model enables the construction, deployment and operation of a compact, highly efficient, and inexpensive drive for exciting the motor.

Thus, contrary to conventional practice, this invention enhances and amplifies the inherent inductive properties of a motor's coil/iron structure by increasing the rotor-stator air gap. A capacitor external to the motor is connected in series with the motor's magnetic inductance to form an LCR circuit, When power is applied, the circuit is caused to oscillate at or near the resonant frequency of the LCR circuit, and the resulting high reactive current is absorbed entirely by the capacitance. The resistance portion of the LCR circuit is comprised partly of winding resistance but mostly of shaft power resistance, the real power load as seen by a power supply. Multiple capacitance values may be switched into the circuit at various torque loads and speeds to enable motor control at constant DC voltage. Pulse Width Modulation (PWM) is not employed for either voltage control or synthesis of a sinusoidal waveform. The inherent oscillatory characteristics of the resonant LCR circuit produce a sinusoidal AC voltage for self-commutation of power switches and efficient operation without resorting to PWM and the accompanying switching losses at high carrier frequency.

Standard electronic drives, in replicating the properties of a mechanical power generator, synthesize a sinusoidal waveform (typically by PWM) that closely approximates a motor's back-emf (motor-generated voltage) in order to minimize "harmonic" power losses that would otherwise result from a waveform mismatch between back-emf and applied voltages. While this approach represents conventional wisdom it is not strictly necessary. In fact, more efficient operation would result if the applied voltage and resulting current could be concentrated near the peak of the back-emf sinusoidal waveform. Motor current, which is the primary source of heat generation, would produce the maximum mechanical work by dropping through the highest available voltage within the motor. However, electrical current focused at the peak of back-emf must be continuous at 100% duty cycle to avoid the accompanying $I^2R$ losses of a pulsed current. Such pulse losses would offset any gain in shaft power and thus reduce the efficiency. This requirement is satisfied in the resonant motor system as to be explained later.

Maximum power and efficiency in an electrical motor are achieved when peak phase current is aligned with the optimum torque angle of 90°. An AC induction motor, due to its intrinsic inductance, cannot produce shaft torque under this ideal condition. In fact, current is applied at a considerable off-angle resulting in more heat production per unit shaft power than would otherwise be necessary. The squirrel-cage rotor, though simple in construction, is not amenable to external current control that might mitigate this situation.

By comparison, the brushless DC motor affords precise timing of stator current relative to rotor position allowing the optimum torque angle at all times.

The AC induction motor nevertheless performs comparably against the brushless DC motor because it operates at near-maximum flux density while the latter operates at only about half the iron core's available flux capacity. So the advantages and disadvantages of each motor, though different, when combined result in nearly equivalent performance in terms of power density (power per pound) and energy efficiency.

A resonant motor system possesses the favorable features of both types of conventional motors (AC induction and brushless DC) without their drawbacks. It runs at a precise 90° torque angle under all load conditions and at near-saturation flux density.

In summary, the shortfalls of conventional practice are overcome in a resonant motor system. All of the operating parameters that could be envisioned in an ideal motor are realized in this resonant motor system while simultaneously obtaining the benefits of self-commutated, rugged, low-cost, high-capacity semiconductor switching devices.

Operating Principles of a Resonant Motor System

The standard AC induction motor is modeled as a transformer where stator windings constitute the primary winding and the squirrel cage rotor represents a single-turn secondary winding. Accordingly, minimal reluctance in the motor core magnetic circuit is desirable in order to minimize the reactive current, or "magnetizing current", which current in an ideal transformer without reluctance would be zero. Reactive current not only adds to resistive losses within and without the motor, but places additional load on the solid-state switching devices. Thus, a principal design goal for the AC induction motor is to absolutely minimize the rotor-stator air gap.

In contrast, in the resonant motor system this reactive current is deliberately enhanced by increasing the rotor-stator air gap to the point where the motor acquires a distinct characteristic of magnetic inductance L having the capability of storing a large amount of magnetic energy. An external capacitor C connected in series with the motor's inductance forms an LCR circuit that oscillates at a natural resonant frequency determined by the component inductance and capacitance values of L and C. Real power losses arising from winding resistance and shaft power production (modeled as a resistance R) are continuously restored by power from the DC source.

In any transformer, or AC induction motor, the reactive (magnetizing) current provides the full magnetic field at near-saturation of the iron core and remains nearly constant independent of load. Once a load is applied to the secondary (slip in an AC induction motor) primary and secondary (stator-rotor) currents rise several times above the reactive current level. While individual primary and secondary magnetic fields increase in proportion to their respective winding currents, there is no increase in the core net magnetic field, which net field has no room to increase anyway since it is already near saturation. This multi-fold increase in motor current without exceeding the saturation limit is made possible by field-cancellation of the primary (stator) and secondary (rotor) magnetic fields. Most of these two large fields cancel each other and retain only the basic net magnetizing field near saturation that is required to support the applied terminal voltage. Thus the current through a transformer or AC induction motor is not constrained by saturation considerations but rather by the capacity for heat dissipation and the dictates of energy efficiency. Real current is defined as the total current minus the reactive (magnetizing) portion, subtracted out vectorally. Real power represents the actual heat and useful load power of the transformer (motor) which is significantly higher than the reactive "power". Again, the ideal motor would have a zero rotor-stator gap in order to approach ideal transformer operation and thereby reduce magnetizing current to the absolute minimum which, in fact, would approach zero if the core had no gap and an infinitely high permeability.

Contrary to conventional practice, the motor of a resonant motor system incorporates a rotor-stator air gap several tens of times larger than the AC induction motor. Surprisingly, what would appear to be a high level of useless reactive (magnetizing) current is the very current which produces real load power at the shaft. In short, the reactive current, while it is indeed 90° out of phase with the motor "inductor" and accompanying capacitor voltages, is actually exactly in phase with the motor-generated back-emf. The high rotor-stator inductive current in the resonant motor system corresponds directly with the high real current in an AC induction motor. However, where field cancellation prevents core saturation in the AC induction motor, the resonant motor system depends on the large rotor-stator gap to prevent core saturation. As a "transformer analogue" the AC induction motor depends on field cancellation to allow high real power current and development of significant shaft power. As an "inductor analogue", the resonant motor system utilizes a large rotor-stator gap to allow large "real" current and development of significant shaft power.

The important difference between the two types of motors is simply this: field cancellation in the AC induction motor comes at the expense of a poor torque angle. On the other hand, there is no field cancellation in the resonant motor system because the net field is mitigated at high current by the large rotor-stator air gap. The resonant motor system is free to run at the optimal torque angle of 90° under all load conditions. Again, in the resonant motor system high current is necessary to produce the required power at a given voltage (as is also the case in an AC induction motor). However, the means for achieving high current without saturation is different between the two motor types, with the preferred way being to avoid field cancellation and the associated loss of efficiency due to a non-optimal torque angle of the AC induction motor. This is precisely the way high current is achieved without saturation in the resonant motor system.

Illustrations and Examples of the Invention

A motor designed and constructed for use in a resonant motor system is illustrated in FIG. 1. The motor, indicated generally by 10, includes a rotor 12 with a shaft 13, a stator 14, an enlarged air-gap 16 between the stator and rotor for storing magnetic energy, and a rotary shaft position encoder 18 mounted on the shaft. It is not necessary to the invention that the air-gap 16 have a uniform shape. Indeed, it is contemplated that the surface topographies of the rotor 12 and the stator 14 can vary in regularity and contour from one design of the resonant motor system to another. The stator 14 is a laminated ferromagnetic structure that is "wound" in that it has one or more coils or windings (not shown) disposed on it. The rotor 12 may also be a wound structure, or it may be unwound with salient poles typical of standard reluctance motor. In the case where the rotor is wound, slip-rings 22 and contact brushes 24 may be provided for electrical connection to the rotor windings.

Figure 2A:
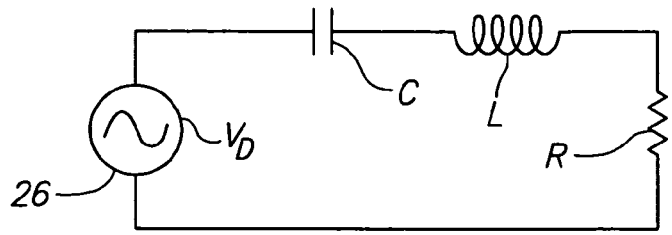
FIG. 2A is a schematic diagram of a generalized resonant LC circuit.

FIG. 2A shows a basic series LCR circuit with capacitance C, inductance L and resistance R connected in series with an AC input driver 26 that provides a drive voltage $V_D$. This is a "driven" oscillator inasmuch as the frequency of $V_D$ ("drive frequency") determines overall circuit frequency. Current through the LCR circuit reaches some maximum value when the drive frequency matches the natural resonant frequency as determined by properties (inductance and capacitance) of the inductor L and capacitor C. The frequency at which maximum current occurs is called the "resonant frequency". This is the same frequency at which the circuit would naturally oscillate indefinitely if $V_D$) and R were removed. At resonance the stored energy in L and C are exactly equal but with opposing voltages so that they cancel one another leaving only the voltage drop across R to regulate current according to Ohm's Law. In other words, the effects of the inductance and the capacitance on the LCR circuit completely drop out so that the circuit behaves simply as though only R were present. With the "reactance" (reactive impedance) of L and C omitted from the circuit, the only remaining circuit impedance is due to R which explains why maximum current flows at resonant frequency.

Figure 2B:
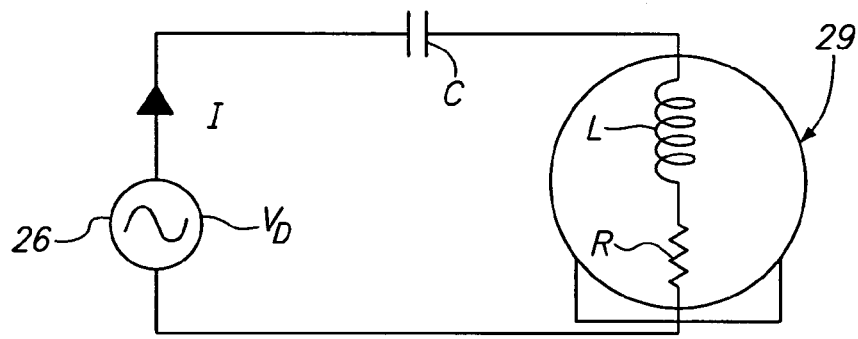
FIG. 2B is a schematic diagram of a resonant motor system in which the stator and/or rotor coils of an electrical motor are modeled as an inductor, and in which the motor is excited by an AC source.

FIG. 2B shows a slightly modified version of the LCR circuit of FIG. 2A wherein L and R are now included within the representation of a motor 29. The coil and gapped core of the motor 29 itself provide the inductive properties of L. Shaft power output, and to a much lesser extent winding resistance, together determine the value of total circuit resistance R. The shaft power component of R ($R_S$) is a function of shaft rotational speed. Thus at a constant circuit current I, output power is proportional to shaft speed which indicates torque must be proportional to $I^2$ since, $P_{SHAFT}=I^2R_S$, a relationship that applies to shaft power as well as to winding losses. Torque is proportional to the square of current because, in the rotor-stator series-connected format of the Resonant motor system, the same current is responsible for both the magnetic field and the current flowing through that field for torque production, similar to the situation in a universal motor.

Figure 3:
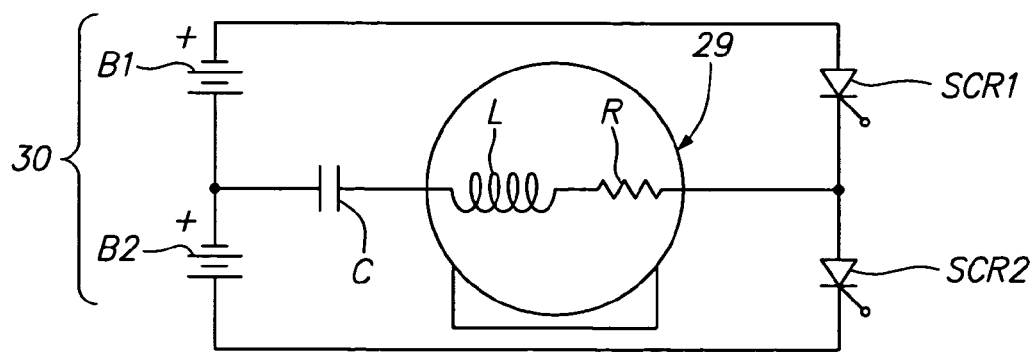
FIG. 3 is a schematic diagram of a resonant motor system in which the motor is excited by a DC power source switched by solid state switches.

The drive voltage $V_D$ of FIG. 2B is necessarily AC at the resonant frequency of the LCR circuit to allow maximum flow of current. However, it is possible to replace the AC driver 26 with a DC power source 30 by introducing solid state switches such as silicon controlled rectifiers (SCR 1 and SCR 2) as shown in FIG. 3. Because a DC source has no inherent tendency to regulate frequency, L and C are free to exchange energy at their natural frequency, i.e., at resonance. The switches SCR1 and SCR2 are simply open or closed and, by themselves, make no contribution to the charging/discharging rate of capacitance C through motor inductance L.

FIG. 3 schematically illustrates a single-phase resonant motor system including a motor 29 having inductance L and resistance R in series with a capacitance C that is external to the motor 29. In this figure, the DC power source 30, constituted of sources B1 and B2 (batteries for illustration only), merely gives a boost to the discharge of capacitance C in order to offset current decay due to resistance R thus assuring C always recharges to its original voltage level but at the opposite polarity. Thus oscillation can continue indefinitely as long as $I^2R$ losses in R are replaced by energy input from the DC source of B1 and B2.

FIGS. 4A–4D replicate FIG. 3 through a series of operational steps constituting one complete cycle. The "on" and "off" states of the SCRs are clarified by simply substituting them with either a closed connection or an open connection.

Figure 4A:
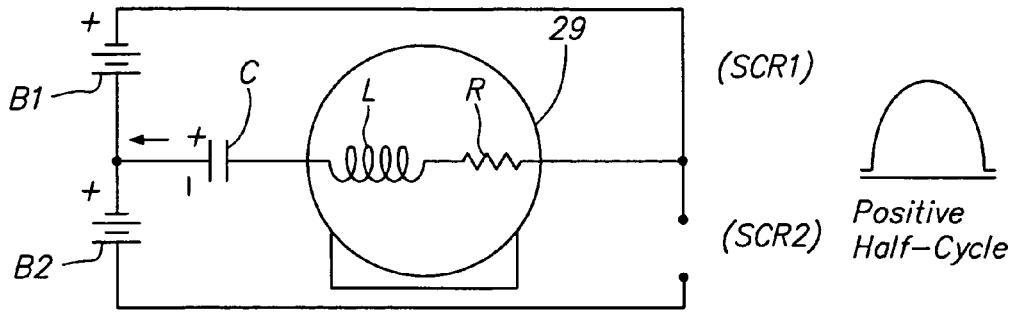
FIGS. 4A–4D illustrate single-phase operation of the resonant motor system of FIG. 3.
Figure 4B:
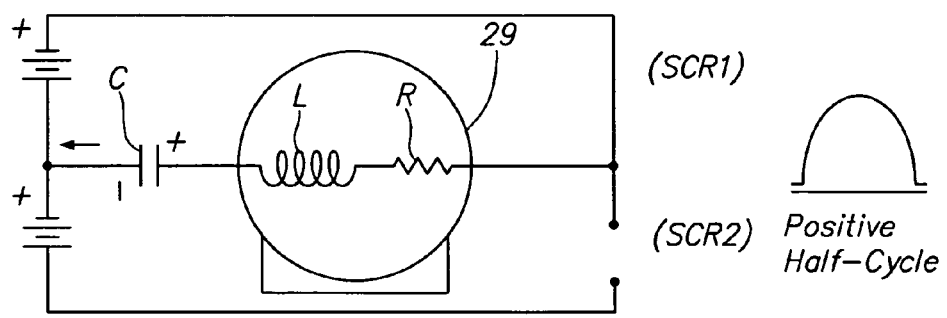

The cycle begins in FIG. 4A with capacitance C charged positively on the left side, switch SCR1 closed and switch SCR2 open. The voltages of C and B1 are additive and in series with the motor impedances of L and R. This compounding of voltages allows C to discharge through the motor 29 and become recharged at the cessation of the discharge pulse at the same voltage but opposite polarity from which it began, as shown in FIG. 4B. The tendency of C to become recharged at the opposite polarity is due entirely to the presence of inductance L which imparts "electrical momentum" in the resonant motor system. At the peak of the current pulse the voltage of C has dropped to zero (voltage and current are always 90° out of phase in any reactive L, C component) and current through L is maximum which represents the "charging" of the inductance with the total energy that was originally stored as an electrical field between the plates of C. The stored magnetic energy of L is then returned to C, which becomes recharged to its original voltage but at opposite polarity. During this discharge-recharge cycle current flows only in one direction, to the left as shown in FIG. 4A and FIG. 4B. The current waveform of this positive half-cycle is sinusoidal.

Figure 4C:
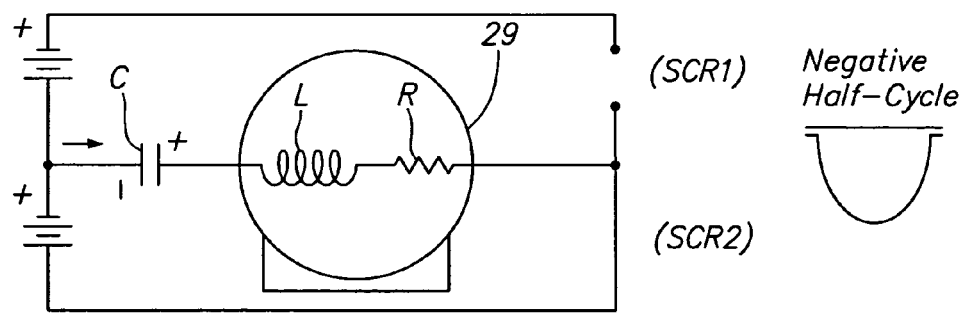
Figure 4D:
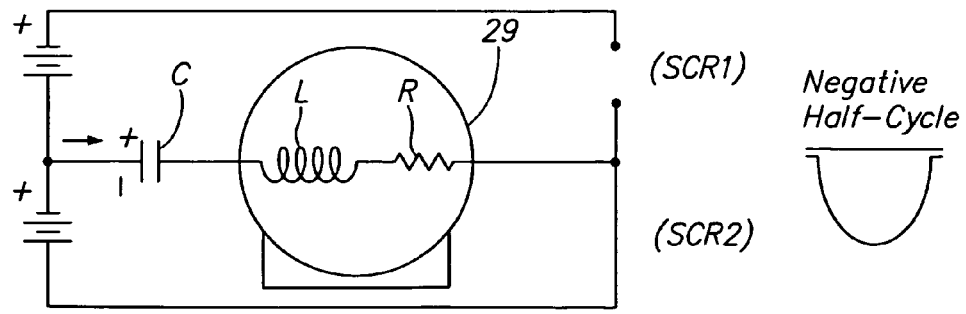

During the next half-cycle the same process is repeated except that now SCR1 is open, SCR2 is closed and current flows to the right as indicated in FIG. 4C and FIG. 4D. At the conclusion of this negative half-cycle C is again recharged with the same polarity it had at the beginning in (FIG. 4A) as shown in FIG. 4D, ready to begin a full cycle over again at FIG. 4A.

If the SCRs are timed to switch at the completion of each half-cycle, a full sinusoidal current waveform is produced through the motor windings without implementation of PWM and the high frequency "hard switching" losses associated with PWM.

Figure 5:
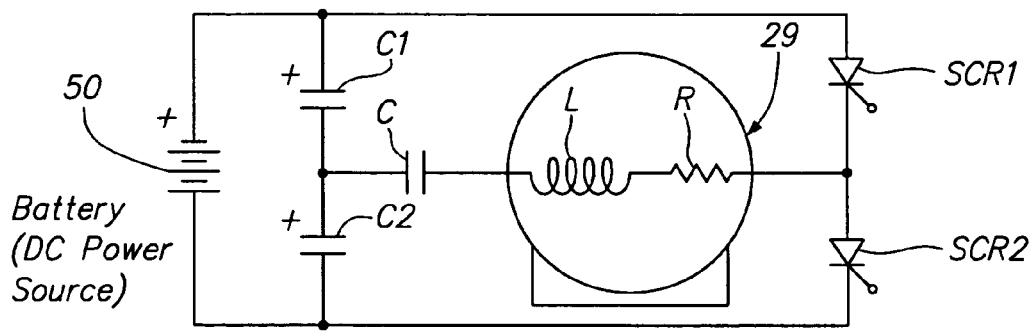
FIG. 5 illustrates a resonant motor system with power provided from a DC source across a capacitance ladder.
Figure 6:
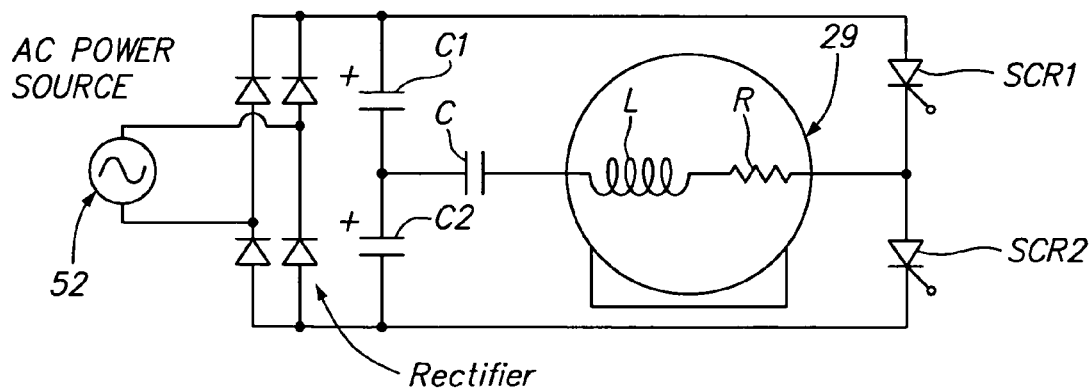
FIG. 6 illustrates a resonant motor system with power provided from a rectified AC source.

FIGS. 5 and 6 show another single-phase resonant motor system in which batteries B1 and B2 are replaced with a capacitance bridge including, in this example, filter capacitors C1 and C2, and the capacitor C is renamed as discharge capacitor C. The filter capacitors C1 and C2 handle the momentary high current surges due to their series connection with the discharge capacitor C. Note, C1 and C2 have a capacitance many times higher than that of C so that their polarity and voltage remain essentially unchanged during the discharge-charge cycle of C. The capacitors C1 and C2 allow the DC power source to see a substantially uniform flow of current rather than high instantaneous current pulses. Charge of the filter capacitors C1 and C2 is maintained by the primary DC power source which is a battery 50 in FIG. 5 and a rectified AC source 52 in FIG. 6.

Figure 7:
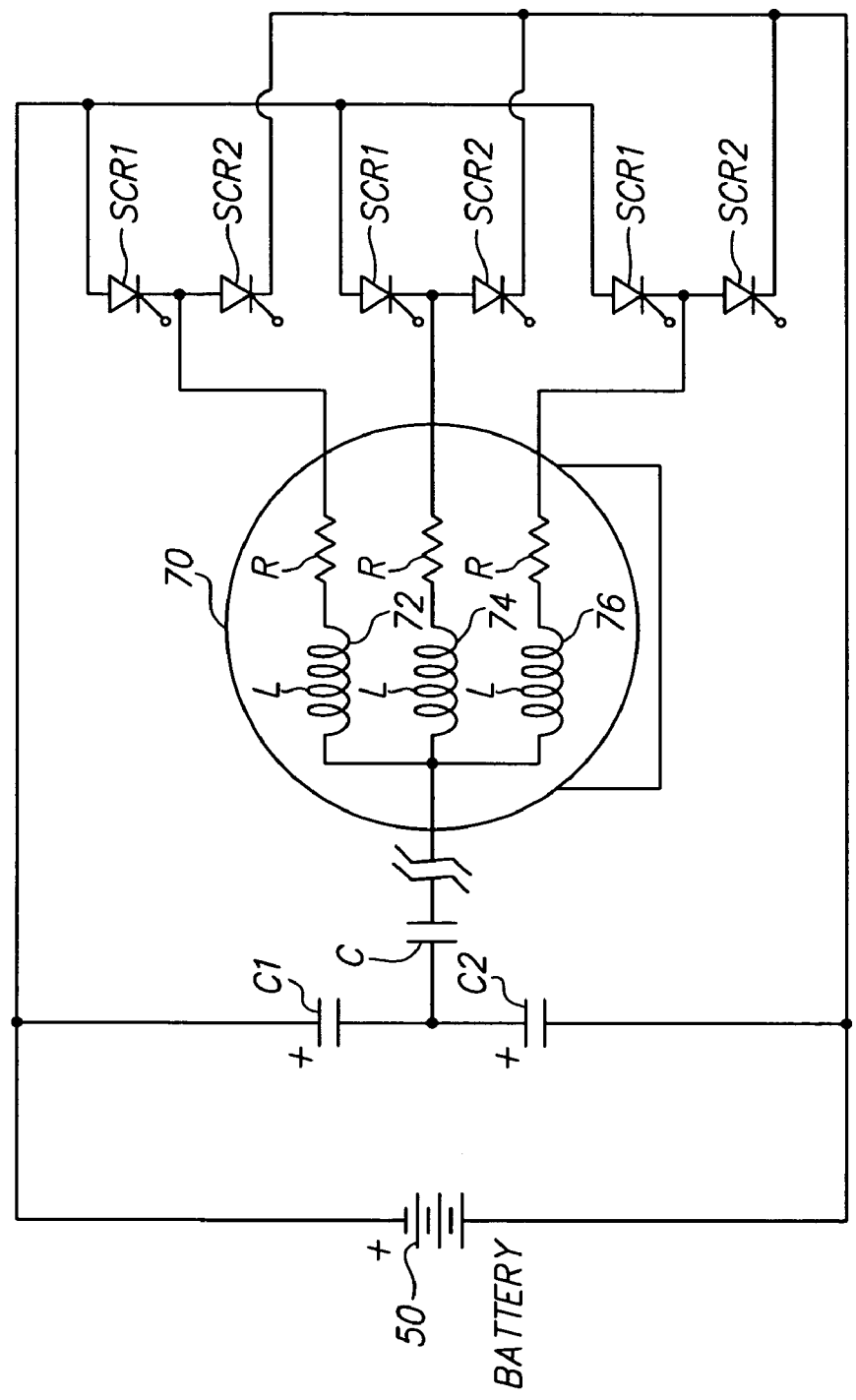
FIG. 7 Illustrates a three-phase resonant motor system.

Oscillator operation applies equally to each phase in multi-phase versions of the resonant motor system. For example, in a three-phase resonant motor system illustrated in FIG. 7, all three phases operate in an identical manner to that shown for one phase in FIG. 4A–FIG. 4D. In this regard, each phase requires two SCRs bringing the total number of SCRs to six for a motor 70 with a 3-phase stator winding constituting coils 72, 74, and 76. The three phases share some components in common. A single main discharge capacitor C used for all three phases is connected in series with each of the stator coils 72, 74, and 76 and the filter capacitors C1 and C2, along with their DC charging source 50, are all shared in common.

Figure 8:
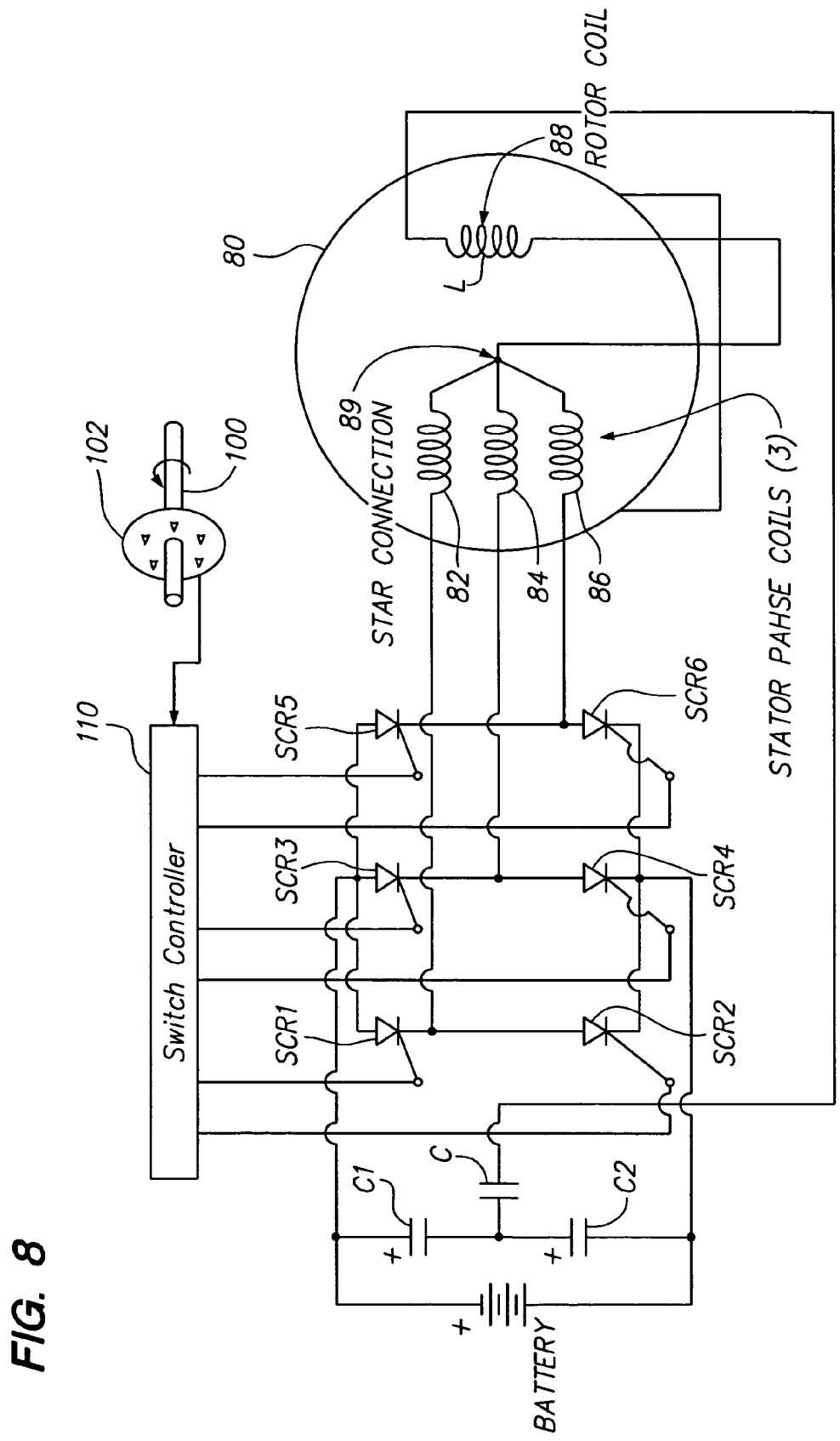
FIG. 8 illustrates another three-phase resonant motor system in which the motor includes a wound rotor.

FIG. 8 illustrates a three-phase resonant motor system in which the motor 80 includes a three-phase winding of coils 82, 84, and 86. In this representation coil resistance R is implied without explicit denotation with a resistor symbol. The motor 80 also includes a rotor coil 88, which contributes to the total circuit inductance L as seen by the discharge capacitor C. The three stator coils all connect on one side through the six SCRs and terminate on the other side at a star connection 89. Via the star connection, the stator coils 82, 84, and 86 are connected in series with the rotor coil 88 thereby incorporating the rotor coil 88 in the series-connected inductance of the motor 80.

Torque Production

Torque in any electrical motor is produced by current flowing through a magnetic field. In some cases the magnetic field is constant and may be created by DC current or a permanent magnet. In other cases the magnetic field may alternate if it arises from an AC current. In all cases it makes no difference theoretically whether the field is in the stator or rotor, a choice that is based on practical considerations only.

Figure 9:
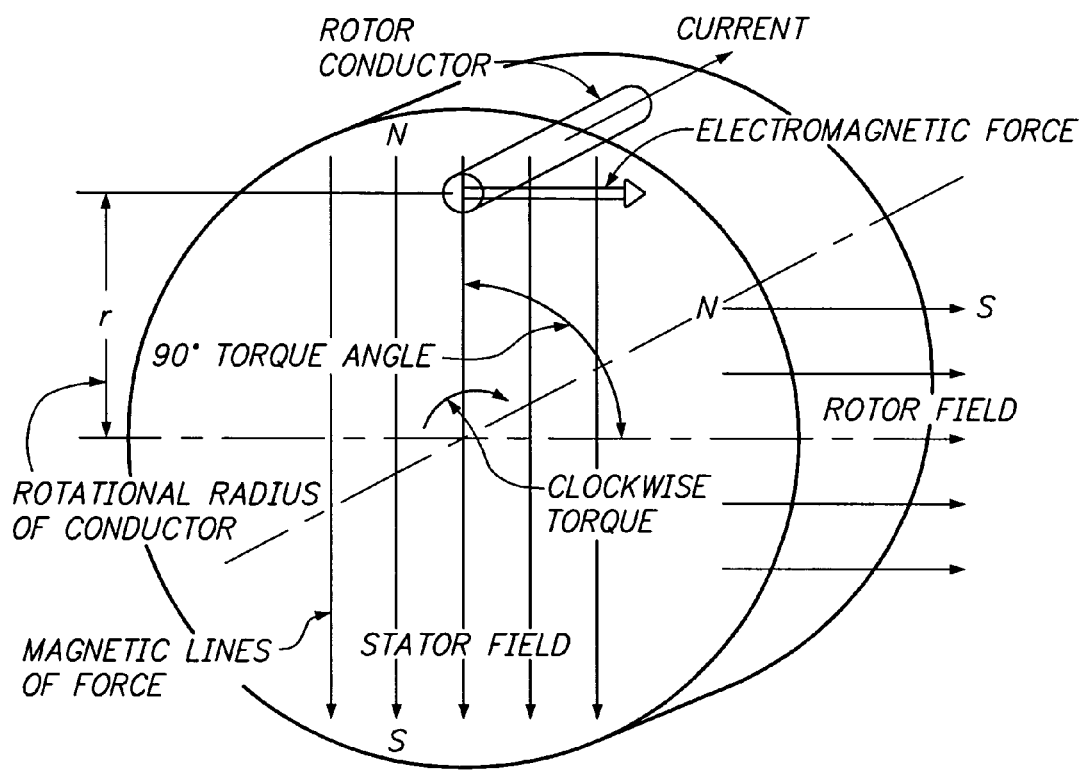
FIG. 9 is a schematic diagram illustrating torque production in an electrical motor.

A force is produced on a current-carrying conductor immersed in a magnetic field. This force is always normal (perpendicular) to both the conductor and the magnetic field "lines of force". In order for this force to produce the maximum torque on the rotor shaft, the direction of force ("torque angle") must also be normal to the rotational radius of the conductor as shown in FIG. 9. Typically, in conventional practice, the sinusoidal current is distributed over 180° of rotor rotation. However, the peak of the sinusoidal current waveform should occur when the rotor conductor is aligned as shown in FIG. 9 such that the peak electromagnetic force is tangential to the rotor, i.e., normal to the conductor radius to give a torque angle of 90 degrees.

Because the conductor forms a closed loop it also produces its own magnetic field, in this case called the "rotor field", which interacts with the "stator field" as depicted in FIG. 9, although various other current-field combinations are possible as mentioned above. Again, the angle between the stator and rotor fields is known as the "torque angle". Under the ideal scenario of FIG. 9 the rotor field is normal to the stator field for a 90° optimal torque angle.

The direction of force applied to the conductor, which is the rotational direction in a motor, may be changed by reversing the direction of either the rotor or the stator magnetic fields, but not both together. Reversing both rotor and stator fields simultaneously causes torque direction to remain unchanged and rotation to occur in a constant direction.

This effect is used advantageously in "series-wound" DC motors which enables them to operate on AC current as well. Due to series connection of stator and rotor windings, AC power causes simultaneous reversal of both stator and rotor fields resulting in unidirectional torque. Such motors, adaptable to either DC or AC, are appropriately called "universal motors". Their applications, however, are far from universal because of inherent low efficiency which relegates them to fractional horsepower household appliances. Mismatch of applied line frequency to the rotational frequency accounts for most of the poor energy efficiency in a universal motor. Similarly to the universal motor, the positive effect of series-connected rotor and stator is also employed in the resonant motor system.

Because the 3-phase motor is so widely manufactured, the exemplary three-phase implementation of the resonant motor system shown in FIG. 8 is used in the following explanation of motor torque in the resonant motor system. This is not intended to limit or otherwise prevent these teachings from being applied to resonant motor systems with more, or fewer phases. With reference to the three-phase resonant motor system illustrated in FIG. 8, the motor 80 includes rotor and stator coils that are series-connected and simultaneously receive AC power from the resonant circuit of which they serve as the inductor portion. This example of a resonant motor system requires no rectifier for the rotor coil 88. Unidirectional torque is produced by reversal of both stator and rotor fields in concert. But unlike a universal motor, current is always applied at the optimal torque angle of 90° providing an optimal match of applied frequency with respect to rotor rotational frequency resulting in efficient conversion of electrical power to mechanical power.

Figure 10:
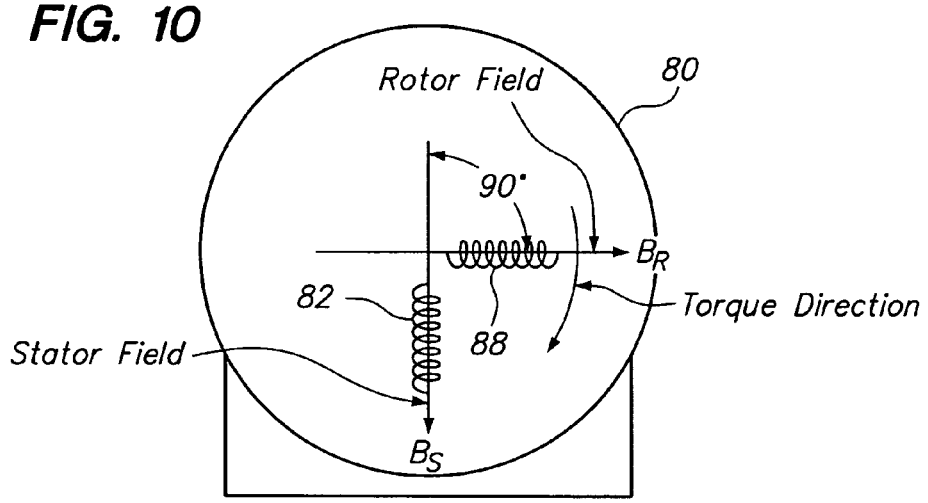
FIG. 10 is a schematic diagram illustrating the interaction of a stator coil with a rotor coil at an optimum torque angle in a resonant motor system.

In FIG. 8 each of the SCRs has a gate which controls the device's operation. In addition, the rotor shaft 100 of the motor 80 has mounted to it a rotary shaft encoder 102. A switch controller 110 is provided that receives information from the rotary shaft encoder 102 regarding the instantaneous position of the shaft 100. This information is processed by the controller to determine the instantaneous rotational position of the rotor coil 88 with respect to the stationary stator coils 82, 84, and 86. In response to rotation of the rotor coil 88 with respect to the stator coils 82, 84, and 86, the switch controller 110 signals the gates of the SCRs to fire the SCRs in a predetermined sequence in order to achieve optimal torque angle for each phase where the rotor field is normal to the stator field by 90°. This is illustrated in FIG. 10 which schematically shows the stator coil 82 of the motor 80 interacting with the rotor coil 88 at the 90° optimum torque angle. Notice the mechanical 90° angular orientation of stator and rotor coils relative to each other. In this rotor position peak oscillator current must flow through both rotor and stator (which are in series-connection) to obtain the theoretical maximum torque output. To assure the rotor is always optimally positioned at the peak of oscillator current, i.e, at the peak discharge current of capacitor C, the rotary shaft position encoder 102 is utilized to send a trigger signal to the gate of the appropriate SCR switch to control timing of capacitor C discharge through the rotor-stator coils. While the rate of discharge is a resonant property of L and C alone, the timing of the discharge relative to shaft position is regulated by the rotary shaft encoder that signals an SCR of shaft alignment at the correct angle to fire and for discharge to begin. Because of the finite discharge time, some lead time must be provided so that the peak of the sinusoidal discharge current occurs at the optimum 90° torque angle. This is analogous to ignition timing advance in an internal combustion engine.

Figure 11:
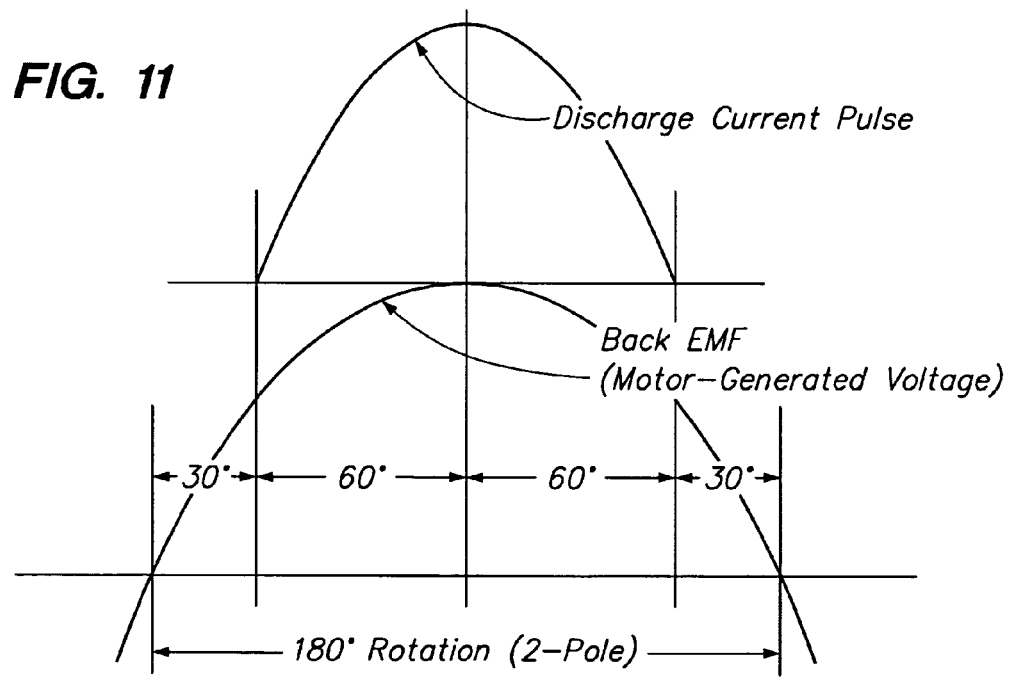
FIG. 11 is a waveform diagram comparing discharge of a capacitor with motor-generated back EMF in a resonant motor system.

FIG. 11 shows the current of a single discharge pulse plotted against time, the same image as seen on an oscilloscope display of the discharge current. Shown just below the sinusoidal discharge waveform is the voltage waveform of the motor-generated voltage, or back emf. Notice that the peak values of both discharge current and back emf coincide. Coincidence of discharge current and back emf voltage peaks is due to angular alignment of the rotor coil with respect to the stator coil at 90°, in other words, the motor is operating at the optimum torque angle.

Dissimilar to standard practice, the resonant motor system does not distribute the drive current across the entire 180° period of back emf. While current and voltage (back emf) waveforms are in phase, meaning their peaks occur simultaneously, their frequencies differ somewhat. In the 3-phase format shown in FIG. 11 the discharge current frequency (not amplitude) is 1.5 times higher than the back emf voltage frequency. In a 2-pole winding layout the back emf frequency is the same as the shaft frequency. In this case a shaft frequency of, say, 100 Hz (6000 rpm) would require an oscillator discharge frequency 1.5 times 100 Hz, or 150 Hz. Even at 12,000 rpm the oscillator frequency is only 300 Hz, which is relatively low, in fact, far below the 10,000 Hz carrier frequency typically found in PWM type controllers. A frequency of 300 Hz is low enough to permit use of "slow" SCRs rather than the more expensive "fast switching" types that would be necessary at frequencies above 2000 Hz.

FIG. 11 shows the discharge pulse begins 60° before the optimum torque angle, or in automotive jargon, the SCR is fired at 60° before TDC (Top Dead Center) in order to allow time for current to rise to its peak level at the same instant the rotor reaches the optimum torque angle.

Notice in FIG. 11 that discharge current does not even begin flowing until the back emf has reached $V_{PEAK} \sin 30° = 0.50 V_{PEAK}$. Since shaft output power P, expressed in electrical terms, is P=I V, where I is discharge current and V is back emf, then the discharge current at lower levels is producing more power P by dropping through a greater back emf than would otherwise occur if distributed over the entire 180° back emf period. All else being equal (same torque angle, same RIMS current) this difference alone results in a 15% increase in torque production per unit heat generation with a commensurate improvement in motor efficiency as compared to current distribution across 180° of back emf.

Figure 12:
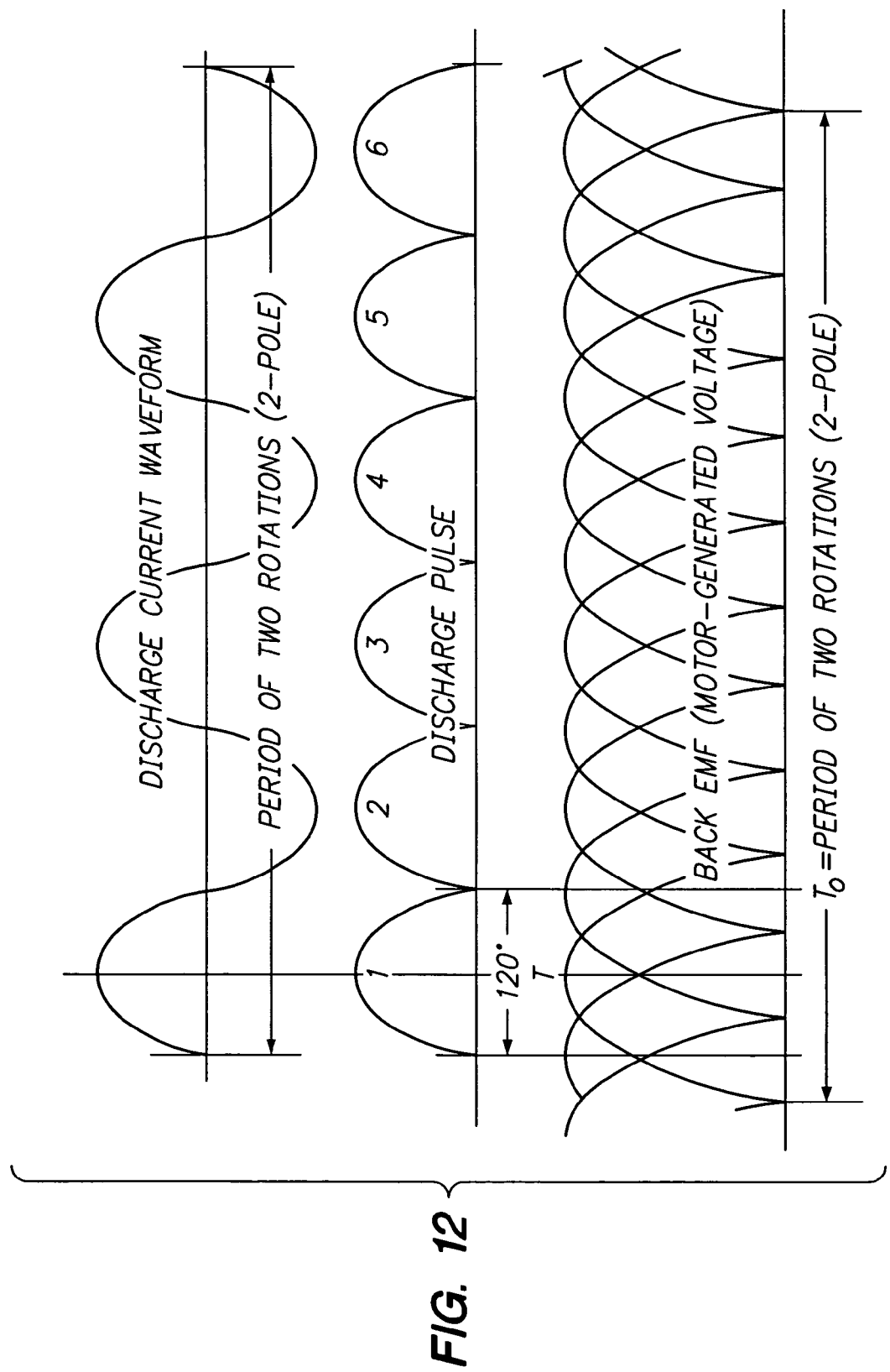
FIG. 12 is a waveform diagram extending the comparison of FIG. 11 through six consecutive discharge half-cycles.

FIG. 12 is an extension of FIG. 11 through sir, consecutive discharge half-cycles, or 3 full discharge cycles, corresponding to two revolutions of the rotor for a 3-phase, 2-pole motor design or a single revolution for a 4-pole configuration. Portrayed just above the six half-waves is the full-wave current flowing into the motor inductance L from the discharge capacitor C. Notice that motor current I (capacitor C discharge current) is continuous and sinusoidal in nature so there is no loss penalty as normally associated in conducting a given average current at low duty-cycle resulting in high rms values and consequent high heat dissipation.

In standard AC induction motor practice, all three phases operate simultaneously and continuously, each independently of the other two. In other words, all three phase coils are "on" constantly with a single-phase current/voltage. These three phases overlap one another with a 120° phase displacement which results in a smooth rotation of the stator magnetic field at constant amplitude. This is an ideal circumstance for "dragging" a squirrel cage or permanent magnet rotor along with the stator field in the AC induction motor or DC brushless motor respectively.

Unlike standard practice, the resonant motor system produces torque pulses in three angularly consecutive rotor positions at 120° intervals in the 2-pole format. The rotor receives a torque impulse with each discharge of capacitor C through the stator-rotor windings while rotating through three 120° increments. Rotor inertia sustains rotation from pulse to pulse with the smoothness of an equivalent 6-cylinder 4-cycle internal combustion engine for the 2-pole format. The overall effect of a pulsating stator field at 120° angular increments is that of a continuously rotating magnetic field at constant RMS amplitude. However, between pulses no magnetic field exists and no starting torque is produced. Full torque is developed only upon rotor rotation, even at very low speeds, say 100 rpm or lower, depending on the rotor/load moment of inertial to sustain rotation between pulses. A 4-pole format simply doubles the pulses per shaft revolution enabling smoother low-speed operation equivalent to a 12-cylinder 4-cycle piston engine.

Figure 13:
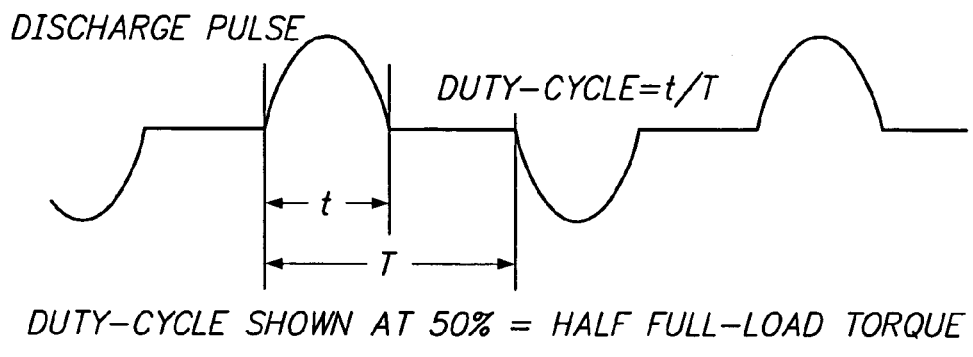
FIG. 13 is a waveform diagram illustrating a torque pulse in a resonant motor system at half full-load torque.

Torque control at constant voltage is possible in the resonant motor system by switching various values of capacitance C into the oscillator circuit, For example, at half full-load torque the torque pulse would be applied at half-duty cycle as illustrated in FIG. 13.

As described above, the three stator coils of the exemplary three-phase resonant motor system are not operating simultaneously as in the typical 3-phase AC motor. In contrast, the stator coils are energized (discharge current) consecutively at one-third duty cycle. Thus the first half-wave pulse passes through the first phase coil (see FIG. 14 and FIG. 15A), then the second half-wave passes through the second phase coil, then the third half-wave passes through the third phase coil. During the preceding two half waves the first phase coil was idle ⅔ of the time at ⅓ duty cycle. Next the fourth half-wave passes through the first phase coil again but now in the opposite direction, then the fifth half-cycle passes through the second phase coil (opposite direction) and finally the sixth half-wave passes through the third coil again but in the opposite direction. Thus all the phase coils take their turn consecutively without overlap. Each coil is "resting" while the other two are successively energizing. Thus each coil is cooling off for ⅔ of the time and conducting discharge current for only ⅓ of the time. At any given moment there is current conduction happening somewhere in the motor but not simultaneously in all three phases as occurs in a standard 3-phase AC induction motor.

With only one phase coil operating at any given moment in the example of FIG. 8, it would appear the resonant motor system would be handicapped to ⅓ the power capacity of a standard motor where all three phases operate simultaneously. However, the ⅔ cooling period permits each coil of the resonant motor system to be driven harder than would be possible at 100% duty cycle in a conventional machine. Thus for a given average heat dissipation capacity, there is no sacrifice of torque due to consecutive energizing of phase coils as opposed to the overlapping energizing of prior art. In fact, as mentioned earlier, per unit of heat generation, the resonant motor system will produce 15% more torque than conventional practice allows, all else being equal.

Energy Efficiency

As explained previously, concentrating current during 120° of the peak back emf, rather than throughout the entire 180°, alone accounts for a theoretical 15% increase in motor efficiency relative to either the AC induction motor or the brushless DC motor. Efficiency is also significantly improved, as compared to the AC induction motor, by applying electromagnetic force at the optimum torque angle of 90° for extracting maximum torque per unit heat generation. And as compared to the brushless DC motor, which runs at about half the core flux density capacity, the resonant motor system realizes maximum materials utilization by operating near the flux saturation limit.

In the exemplary three-phase resonant motor system of FIG. 8, a single-phase wound rotor interacts with a poly-phase stator. As usual, the pole number of the rotor corresponds with the pole number of the stator which in most cases will be a 4-pole configuration. Only for clarity of description is the 2-pole format illustrated. The single-phase rotor is wound with the same number of effective turns as any one of the stator phase coils. The rotor and stator are connected in series through slip-rings. Current flowing through the rotor at any instant is exactly identical to current flowing in the stator. Because rotor and stator (per phase) winding turns are the same, their ampturns are also the same, and because both rotor and stator share the same magnetic circuit (same reluctance) these same amp-turns produce identical flux densities of both rotor and stator. For all intents and purposes, rotor and stator fields are indistinguishable. The only way to uniquely identify them is that the rotor field rotates with the rotor and the stator field is fixed stationary, at any instant, to the stator. Due to timing of SCR firing, as referenced to shaft position by a rotary encoder, the peak rotor and stator fields will always be aligned at 90° to one another under all extremes of speed and load conditions.

The entire physical and operating scenario of the resonant motor system represents the most ideal design conceivable from a strictly theoretical standpoint. The fact that the field is pulsating and step-rotating in 120° increments, rather than continuous as with a poly-phase power supply, is irrelevant because torque in the resonant motor system is a function of the square of current, the same relationship as heat generation, so that the RMS values of both torque and resistive loss hold a constant proportion to each other regardless of absolute current amplitude. In short, there is no loss penalty incurred with a pulsating stationary field as opposed to constant-amplitude rotating fields. In this regard, as described above, torque is the result of current flowing through a magnetic field. For ease of visualization, assume rotor current flows through the stator field as shown in FIG. 9. (With rotor and stator coils identical and connected in series, the current of one produces the field of the other, and vice-versa. So it does not matter how it is visualized; it could just as well be stator current flowing through the rotor field and the results would be the same.) Torque T is a function of the product of rotor current I and stator field B. (B=flux density), so that: T=k I B, where "k" is a proportionality constant. In the wound rotor example of FIG. 8, due to the series connection of rotor and stator, B itself is a function of current I so that: T=k I². Thus torque is proportional to the square of current, the same relationship to current I as resistive power loss.

Motor efficiency E is defined as the ratio of mechanical power output to electrical power input:

$E = P_{MECH}/P_{ELECT}$

Let.

$P_{ELECT} = (P_{MECH} + P_{LOSS})$ so that:

$E = 1/(1 + P_{LOSS}/P_{MECH})$

Thus the ratio of $P_{LOSS}$ to $P_{MECH}$ should be kept as low as possible for maximum efficiency.

Let: $P_{LOSS} = I^2 R$ and $P_{MECH} = f T = k f I^2$ where f=shaft angular rotational frequency.

With these substitutions, E becomes:

$E = 1/(1 + R/k f)$

Since R and k are fixed, then efficiency E is shown to be a function of only one operational variable: shaft speed f, for a given motor design. Regardless of the instantaneous value of pulse current or the overall RMS current level, efficiency is in no way affected by current as long as motor operation remains within the core saturation limits. Thus there is no loss penalty associated with a stationary pulsating magnetic field as opposed to a continuous-amplitude rotating field.

It should be noted that with the peak field limited to the saturation value, the core has an RMS value of flux density at $0.707 B_{SAT}$ whereas with a constant-amplitude field the core has a continuous flux density of the full $B_{SAT}$. This difference has been accounted for in calculating the ratio of average torque per unit heat production for comparison of the resonant motor system with AC induction type of motors.

Theoretical projections indicate the resonant motor system is capable of producing nearly twice the shaft power per unit heat generation as compared to a conventional AC induction motor. If this proves accurate, then a conventional motor rated at 92% efficiency could produce the same power output at 96% efficiency when operating on the proprietary resonant principle. Viewed differently, the same size of motor could produce twice the shaft power with the same heat dissipation (cooling) capacity, or alternatively, the same shaft power could be produced by a smaller motor without loosing efficiency.

Power Density

In common with all electromagnetic devices, the resonant motor system is very sensitive to overall size. For a given efficiency E, at fixed shaft speed and motor "shape", absolute power increases as the $5^{th}$ power of any dimension. But weight increases only as the $3^{rd}$ power of any dimension. Therefore power density, power per unit weight (hp/pound), increases as the square of any dimension. For example, if the motor diameter is doubled and all other dimensions, such as length and diameter, also double (retaining the same shape), then power output increases by $2^5=32$ times and power density increases by $2^2=4$ times. Again, this relationship of size to power holds only if shape, efficiency and shaft speed are held constant.

Rotor-Stator Air Gap

The proportionality constant "k", in the above equations for efficiency, contains several dimensional variables. One of the design parameters contained in "k" that is relevant to the resonant motor system is the ratio of rotor-stator gap to rotor diameter. All else being equal, this ratio remains constant for any size motor operating at a given efficiency. If the gap is too large, an excessive current is required to raise motor magnetization (core flux density) to near saturation which results in high heat generation and reduced efficiency. On the other hand, if the gap is too small, power output is unnecessarily diminished due to low winding current constrained by core saturation, albeit efficiency is very high. So there is a tradeoff between acceptable efficiency and reasonable power production, a situation faced in motor design generally.

Motor Cooling

The rotor-stator gap in the motor of the resonant motor system is appreciable larger than in conventional motor practice. For instance, a 5.0" diameter rotor may have an air gap as large as ⅛ inch thereby offering access to axial air flow. The source of most heat generation, "copper losses", is resistive power dissipation arising from current in the windings. Stator and rotor windings occupy slots adjacent to the interior and exterior surfaces respectively. Thus heat is most effectively removed directly from these surfaces where it originates, which surfaces in a standard motor are unavailable to air circulation for cooling purposes. It is possible that the large, open stator-rotor gap will permit more than twice the cooling capacity of a conventional motor.

Rotor Slip Rings

In those instances of the resonant motor system including a wound rotor, the rotor is preferably wound as single-phase necessitating only two slip-rings at most, regardless of the number of stator phases (see FIG. 1). The number of rotor poles, however, must correspond to the number of stator poles. But since the pole coils all operate in-phase they may be connected in series, as with the stator, so that only two coil leads emerge from the rotor winding which connect to the two slip-rings.

Due to high rotor current, which is equal to stator current, several brushes angularly disposed and in contact with the same slip-ring may he implemented to reduce brush-ring contact current density to levels facilitating extension of brush life.

It should be pointed out that brush life in a slip-ring application far exceeds that found in mechanical commutation of a standard brush-type DC motor inasmuch as no switching function is involved.

Capacitor Size

As discussed above, in a resonant motor system the motor itself functions as an inductor in conjunction with a capacitor to form a resonant oscillator circuit. In a resonant circuit there is equal exchange of energy between the inductor and capacitor. Energy is stored magnetically in the rotor-stator gap of the motor "inductor" and equivalent energy storage is provided in the electrical field within the capacitor dielectric volume. Thus for given magnetic and electrical field strengths, the ratio of motor gap volume to capacitor gap (dielectric) volume will always be constant. In short, there is a fixed proportionality between capacitor size and motor size independent of actual size, i.e , capacitor size is linearly proportional to motor size. Using standard power factor correction capacitors for the discharge capacitor C, the overall capacitor volume is approximately equal to overall motor volume, while capacitor weight density is 4–5 times less that motor weight density.

Constant DC Voltage Input

The resonant motor system generates a back emf proportional to shaft speed just like any other motor. Motor current is determined by the difference between applied voltage and back emf (motor-generated voltage). For a constant applied voltage, motor current will decline as shaft speed increases Thus to maintain constant current the applied voltage must be varied in proportion to speed. In typical motor controller design this volts/frequency (V/Hz) ratio is held nearly constant throughout the speed range thus necessitating a variable voltage input.

In the resonant motor system, current from a constant DC voltage input will also rise as speed drops and vice-versa. In a standard motor this phenomena would make torque inversely proportional to speed. However, the resonant motor system provides additional flexibility for controlling torque independent of speed by means of switching various capacitance values C into the oscillator circuit to provide only the torque required as a function of discharge duty-cycle. Since speed is usually varied by controlling torque, then speed control is also facilitated by varying C at constant DC voltage input.

This strategy works only to a point. Even though torque and speed are controlled as just explained, the instantaneous discharge current is still inversely proportional to speed.

Only the discharge duty-cycle is affected by varying the capacitance values, which duty-cycle in turn controls torque. Thus the speed range for a fixed DC voltage is restricted by core saturation at the low-speed end of the range, and by insufficient torque at 100% discharge duty cycle at the high-speed end of the range due to reduced flux density accompanying the low current. Depending on breadth of the speed range, two or more fixed voltage steps may be necessary to accommodate the full range, which voltage steps may be available from transformer taps if the original power source is AC, from the standard 230/460 mains supply for a maximum of two voltage steps without a transformer, or from various combinations of parallel and series connections if power comes from a DC battery supply. Pulse Width Modulation for voltage control is thereby eliminated.

Teaching Example of a Resonant Motor System

FIGS. 1, 8, 14, 15A, and 15B, taken together provide a convenient teaching example of a resonant motor system according to this invention based on a two-pole, three-phase, wound rotor motor. However, this example is not intended to so limit the practice of the invention. Indeed, a resonant motor system can include motors with many combinations of numbers of poles and phases and rotor constructions.

Figure 14:
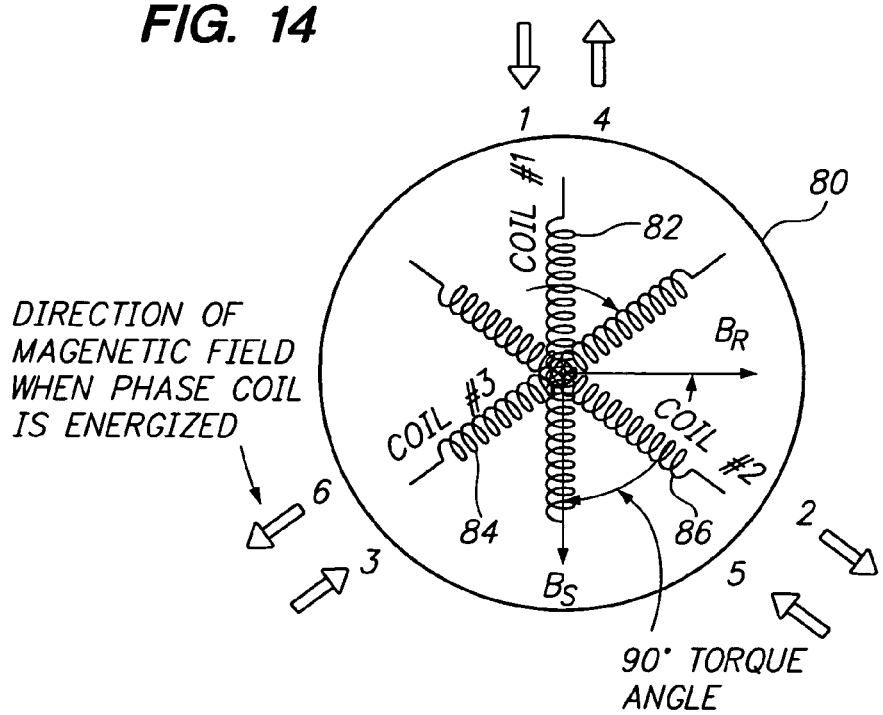
FIG. 14 is a schematic diagram of three stator coils, with a rotor magnetic field vector superimposed, in a three-phase resonant motor system.

FIG. 14 shows schematically an end view of a motor in a preferred three-phase resonant motor system with the three coils of a 3-phase stator winding and the 1-phase rotor magnetic field superimposed. The stator and rotor magnetic fields are labeled $B_S$ and $B_R$ respectively and are shown at the optimum 90° torque angle. Notice the three 120° angular positions at which the three phase coils are sequentially fired. As shown, the vertical stator coil is energized at the $1^{st}$ position to create a downward-directed stator field $B_S$ interacting with the right-hand rotor field $B_R$. Due to the tendency of magnetic fields to seek alignment, a clockwise torque is produced on the rotor coil. When the rotor has rotated another 120° clockwise, peak discharge current will be flowing through the successive stator coil energized at the $2^{nd}$ position. Thus a pulsating, incrementally "rotating" stator field is created, which reverses polarity with each discharge, to which the alternating rotor field continually receives a torque impulse to produce unidirectional rotation.

Figure 15A:
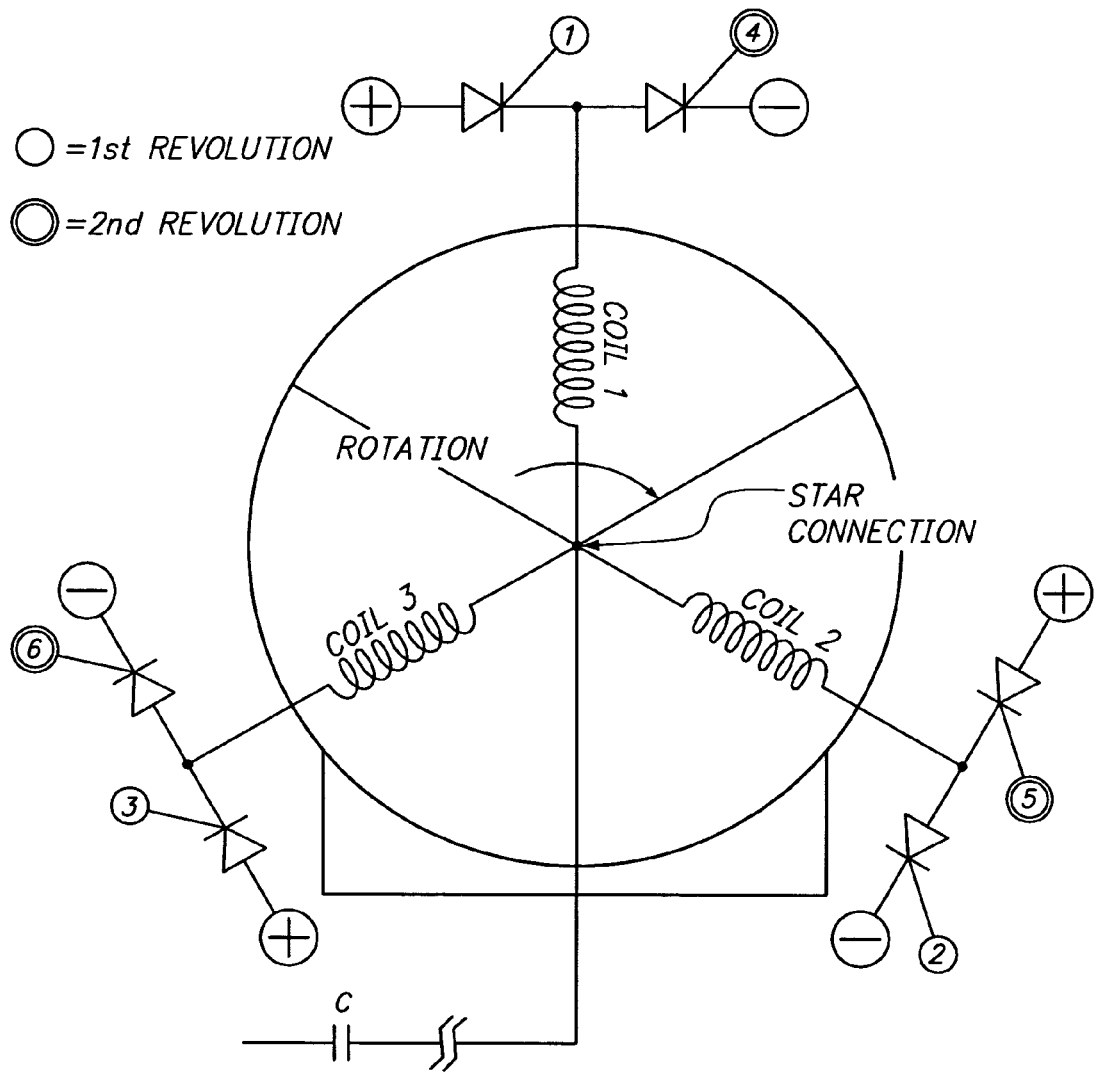
FIGS. 15A and 15B are schematic diagrams in which three stator coils of a three-phase resonant motor system are shown, in equivalent but alternate layouts, with solid state switches of an associated drive.

FIG. 15A shows the three-phase coil layout with star connection at the center and solid-state switches in the form of SCRs around the periphery. Note that a fourth external motor lead is attached to the internal star connection. The SCR gates are labeled with a firing sequence that produces a clockwise, incrementally-rotating magnetic field as shown in FIG. 14. Providing for a 180° angular displacement of firing pulses with respect to shaft position will reverse rotor rotation in which the firing sequence then automatically counts backward.

Figure 15B:
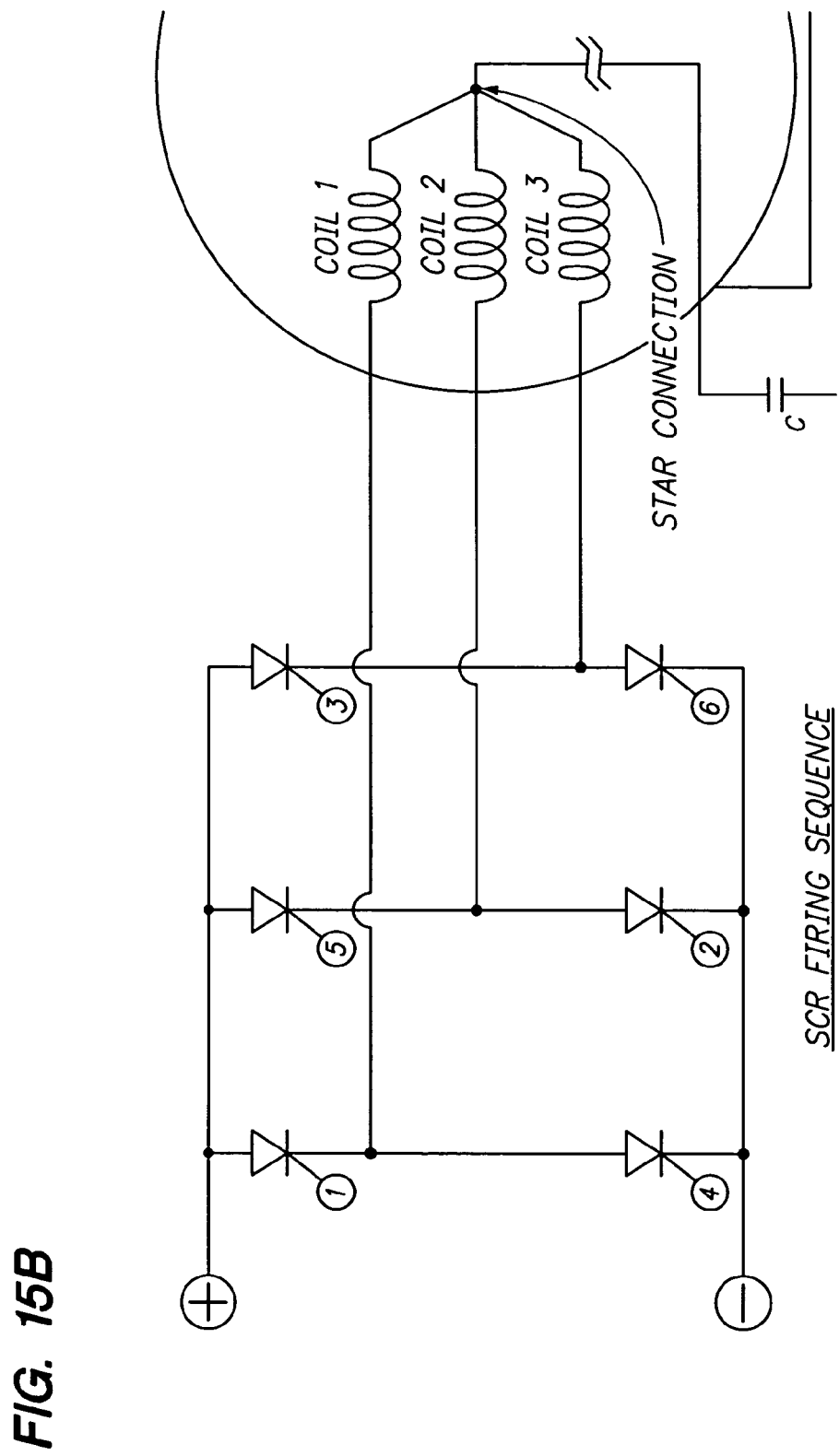

FIG. 15B is identical to FIG. 15A except presented in an alternate layout familiar to those involved in motor technology. Notice that FIG. 15B represents a portion of FIG. 8 except with the SCR firing sequence now labeled on the gates.

As mentioned earlier, a 2-pole implementation of the resonant motor system requires two full revolutions of the motor's shaft to encompass the six SCR firing pulses, each occupying 120° of shaft rotation for a total of 720 mechanical degrees per 360 electrical degrees, where one electrical cycle is defined as the sequential firing of all six SCRs. Thus if the rotary encoder output is directly coupled to the SCRs it must rotate at half shaft speed in the 2-pole format. A 4-pole format requires twice as many pulses per shaft revolution (six half-wave) pulses such that the rotary encoder may be mounted directly to the motor shaft. A 6-pole motor requires the encoder to rotate a 1.5 times shaft speed and an 8-pole at twice shaft speed.

Two-Phase Example

FIG. 16 illustrates an example of a resonant motor system in which a motor 200 includes two stator coils 202 and 204 and two rotor coils 206 and 208. The coils are connected electrically so that the stator coil 202 is in series with the rotor coil 206 and the stator coil 204 is in series with the rotor coil 208. The resonant motor system includes the discharge capacitor C connected in a first series connection with DC power source 210, the solid state switch SCR1 and the coils 202, 206, and in a second series connection with DC power source 212, the solid state switch SCR2, and the coils 204, 208. Not shown is the control mechanization for the gates of the SCRs which can be provided with the arrangement shown in FIG. 8. With SCR2 deactivated and in a non-conducting state, and with SCR1 activated and in a conducting state, the first series connection conducts current in a first phase from the positive pole of the DC power source 210 through SCR1, coil 202, coil 206, C, to the negative pole of the DC power source 210. In the second phase, with SCR1 deactivated, and in a non-conducting state, and with SCR2 activated and in a conducting state, the second series connection conducts current in a second phase from the positive pole of the DC power source 212 through C, coil 208, coil 204, SCR2, to the negative pole of the DC power source 210. The LCR circuit oscillation causes the creation of torque between the rotor and stator coils, exciting the motor 200 and causing it to operate according to the principles described above.

What is claimed:

1. An integrated electric motor and drive, comprising:
   a motor including a stator and a rotor which define an energy storage gap therebetween, the stator including three stator coils and the rotor being supported within the motor to rotate relative to the three stator coils;
   an energy storage capacitor coupled in series with the three stator coils and the energy storage gap to form a resonant LCR circuit;
   a rotary shaft encoder configured to detect a rotational position of the rotor with respect to the three stator coils; and
   a switch controller configured to energize the three stator coils based on the rotational position of the rotor as detected by the rotary shaft encoder, the three stator coils being energized at one-third duty cycle such that the rotor field is normal to the stator field by about 90° and no two stator coils are energized simultaneously.

2. The integrated electric motor and drive of claim 1, further comprising:
   a switching network coupled between the energy storage capacitor and the three stator coils, the switching network being controlled by the switch controller to energize the three stator coils.

3. The integrated electric motor and drive of claim 1, wherein the energy storage gap causes the electric motor to exhibit characteristics of an inductor.

4. The integrated electric motor and drive of claim 1, wherein the energy storage capacitor causes the motor to store energy within the energy storage gap.

5. The integrated electric motor and drive of claim 1, wherein the rotor includes a rotor coil coupled in series with the three stator coils.

6. The integrated electric motor and drive of claim 1, wherein the LCR circuit oscillates when energized by the switch controller.

7. The integrated electric motor and drive of claim 1, wherein the energy storage capacitor is configured to store an equal amount of electrical energy as the energy storage gap.

8. An integrated electric motor and drive, comprising:
   a motor including a stator and a rotor which define an energy storage gap therebetween, the stator including three stator coils and the rotor being supported within the motor to rotate relative to the three stator coils;
   an energy storage capacitor coupled in series with the three stator coils and the energy storage gap to form a resonant LCR circuit;
   means for detecting a rotational position of the rotor with respect to the three stator coils; and
   means for energizing the three stator coils based on the rotational position of the rotor, the three stator coils being energized at one-third duty cycle such that the rotor field is normal to the stator field by about 90° and no two stator coils are energized simultaneously.

9. The integrated electric motor and drive of claim 8, wherein the energy storage gap causes the electric motor to exhibit characteristics of an inductor.

10. The integrated electric motor and drive of claim 8, wherein the energy storage capacitor causes the motor to store energy within the energy storage gap.

11. The integrated electric motor and drive of claim 8, wherein the rotor includes a rotor coil coupled in series with the three stator coils.

12. The integrated electric motor and drive of claim 8, wherein the LCR circuit oscillates when energized.

13. The integrated electric motor and drive of claim 8, wherein the energy storage capacitor is configured to store an equal amount of electrical energy as the energy storage gap.

* * * * *